(12) United States Patent
Joo et al.

(10) Patent No.: US 7,896,511 B2
(45) Date of Patent: Mar. 1, 2011

(54) INPUT DEVICE AND MOBILE COMMUNICATION TERMINAL HAVING THE SAME

(75) Inventors: Won Seok Joo, Seoul (KR); Seung-Geun Lim, Seoul (KR); Young-Joong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 761 days.

(21) Appl. No.: 11/865,602

(22) Filed: Oct. 1, 2007

(65) Prior Publication Data

US 2008/0088591 A1    Apr. 17, 2008

(30) Foreign Application Priority Data

Sep. 29, 2006  (KR) ............... 10-2006-0095971
Mar. 16, 2007  (KR) ............... 10-2007-0026324

(51) Int. Cl.
*H04M 1/00* (2006.01)
*H04M 1/22* (2006.01)

(52) U.S. Cl. ............ 362/24; 362/85; 362/230; 345/170

(58) Field of Classification Search ............ 362/23, 362/24, 85, 230, 231, 234, 253, 800; 345/169, 345/170, 176, 173; 379/368; 455/550.1
See application file for complete search history.

(56) References Cited

U.S. PATENT DOCUMENTS

| | | | |
|---|---|---|---|
| 6,254,249 B1 * | 7/2001 | Kim et al. | 362/109 |
| 6,720,863 B2 | 4/2004 | Mager et al. | |
| 7,014,377 B2 * | 3/2006 | Yamauchi | 400/472 |
| 7,249,861 B2 * | 7/2007 | Coleman et al. | 362/24 |
| 7,600,880 B2 * | 10/2009 | Cybart et al. | 362/24 |
| 2004/0263482 A1 | 12/2004 | Goertz | |
| 2005/0212778 A1 | 9/2005 | Yeh | |
| 2006/0205431 A1 | 9/2006 | Newstead | |
| 2007/0046637 A1 * | 3/2007 | Choo et al. | 345/169 |
| 2007/0081340 A1 | 4/2007 | Chung et al. | |
| 2007/0152977 A1 | 7/2007 | Ng et al. | |
| 2008/0030482 A1 | 2/2008 | Elwell et al. | |

* cited by examiner

*Primary Examiner*—Bao Q Truong
(74) *Attorney, Agent, or Firm*—Birch, Stewart, Kolasch & Birch, LLP

(57) ABSTRACT

An input device and a mobile terminal including the same is provided. The input device includes a housing formed of a non-conductive material and having at least one transmissive region, a touch board spaced from the housing, a displaceable conductive member located between the housing and the touch board, and a plurality of light emitting units, each light emitting unit being located on the touch board.

16 Claims, 12 Drawing Sheets

FIG. 15

INPUT DEVICE AND MOBILE COMMUNICATION TERMINAL HAVING THE SAME

CROSS-REFERENCE TO RELATED APPLICATIONS

This application claims priority to Korean Patent Application No. 10-2006-0095971, filed Sep. 29, 2006, and Korean Patent Application No. 10-2007-0026324, filed Mar. 16, 2007, both of which are herein incorporated by reference.

BACKGROUND OF THE INVENTION

1. Field of the Invention

The present invention relates to an input device and a mobile terminal including the same, and more particularly, to an input device having a plurality of light emitting units that can be turned on/off to provide one or more illumination patterns and a mobile terminal including the same.

2. Description of Related Art

A mobile terminal, including a mobile phone or a PDA, is one of many mobile electronic devices that allow a user to wirelessly transmit/receive and read/process information while the user moves about.

While users demand that mobile terminals become ever smaller, the mobile terminals still need to provide sufficient mechanical support to implement various functions within the mobile terminals and also provide an interface environment that allows users to conveniently and easily use the various functions.

Generally, a conventional mobile terminal includes a keypad unit to operate various functions or to perform inputting operations. In addition, the mobile terminal uses an illumination system such as an LED to allow marks of keys to be seen and manipulated in the dark.

Figure 1:
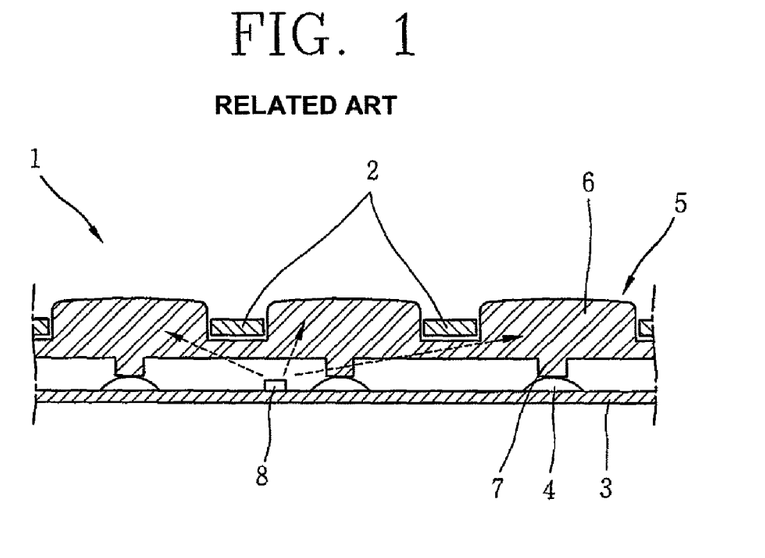
FIG. 1 is a sectional view showing a keypad unit of a mobile terminal according to the related art.

For example, as seen in FIG. 1, a conventional keypad unit 1 includes multiple keys 5. Each key 5 includes a dome switch 4 mounted on a board 3 and a key button 6 that operates the dome switch 4. The key button 6 is supported by a terminal mechanism 2 so as not to be released therefrom, and a pressing protrusion 7 is formed at a lower surface of each key button 6 in order to press the dome switch 4. A certain gap is formed between the key buttons 6 and the board 3, between which an LED 8 is located.

With such a construction, a user may press each key button 6 to operate a corresponding dome switch 4 to perform an inputting operation. Light emitted from the LED 8 illuminates all the key buttons 6, informing the user about positions of the respective keys 5 and marks of the key buttons 6 so that the user can easily recognize the keys 5 in the dark.

However, the related art keypad unit 1 is disadvantages in that because the LED 8 is devised only for backlighting of the keys 6, its utilization is minimized.

BRIEF SUMMARY OF THE INVENTION

Therefore, in order to address the above matters the various features described herein have been conceived. One aspect of the exemplary embodiments is to provide a mobile terminal capable of implementing diverse illumination effects as well as illuminating keys.

According to principles of this invention, an input device including a housing formed of a non-conductive material and having at least one transmissive region, a touch board spaced from the housing, a displaceable conductive member located between the housing and the touch board, and a plurality of light emitting units, each light emitting unit being located on the touch board, is provided.

In another aspect, the housing may include an input key to input information.

In a further aspect, the input device may include a print layer located on a lower surface of the housing, the print layer including at least one of a character, a number, or a symbol is provided on the print layer and is visible through the input key. Alternatively, at least one of a character, a number or a symbol may be engraved or embossed at one of an upper and lower surface of the housing to indicate the input key.

In a different aspect, the displaceable conductive member may include a plate having a plurality of through holes, each through hole defining a space in which one of the plurality of through holes is received, and a signal transmissive member formed at the periphery of each through hole, each signal transmissive member being configured to transfer an electrical signal generated by a touch applied to the housing to the touch board.

In still another aspect, the plurality of light emitting units may be light emitting diodes (LEDs).

In another aspect, the plurality of light emitting units may be arranged in an M by N matrix form, where M and N are integers greater than one.

In yet another aspect, the input device may include a controller configured to selectively turn on at least one of the light emitting units to be visible through the at least one transmissive region when the touch board senses a touch applied to the housing.

In a farther aspect, the controller m-nay include a touch signal receiving unit configured to receive a signal from the touch board and retrieve a corresponding position and recognition value, an illumination pattern searching unit configured to retrieve an illumination pattern of a light emitting unit corresponding to the signal retrieved by the touch signal receiving unit, and an on/off signal applying unit that applies an on/off signal of light emissions corresponding to the illumination pattern.

In yet a further aspect, the light illumination pattern may be generated by one of position, on/off time, brightness of the light emitting units, and ally combination thereof. If the light emitting units are configured to implement at least two colors, and the illumination pattern is generated by a combination of color, position, on/off time, and brightness of the light emitting units.

According to principles of the present invention, a mobile terminal including a cover formed of a non-conductive material and having at least one transmissive region, a touch board spaced from the cover, a displaceable conductive member located between the cover and the touch board, and a plurality of light emitting units, each light emitting unit being located on the touch board, is provided.

In another aspect, the displaceable conductive member includes a plate having a plurality of through holes, each through hole defining a space in which one of the plurality of through holes is received, and a signal transmissive member formed at the periphery of each through hole, each signal transmissive member being configured to transfer an electrical signal generated by a touch applied to the cover to the touch board.

In yet another aspect, the plurality of light emitting units may be light emitting diodes (LEDs).

In still another aspect, the plurality of light emitting units may be arranged in an M by N matrix form, where M and N are integers greater than one.

In another aspect, the mobile terminal includes a controller configured to selectively turn on at least one of the light emitting units to be visible through the at least one transmissive region when the touch board senses a touch applied to the cover.

In yet another aspect, the controller changes an illumination pattern of the plurality of light emitting units according to a usage mode of the mobile terminal.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Exemplary input devices and mobile terminals having the same according to the present invention will now be described in detail with reference to the accompanying drawings.

Figure 2:
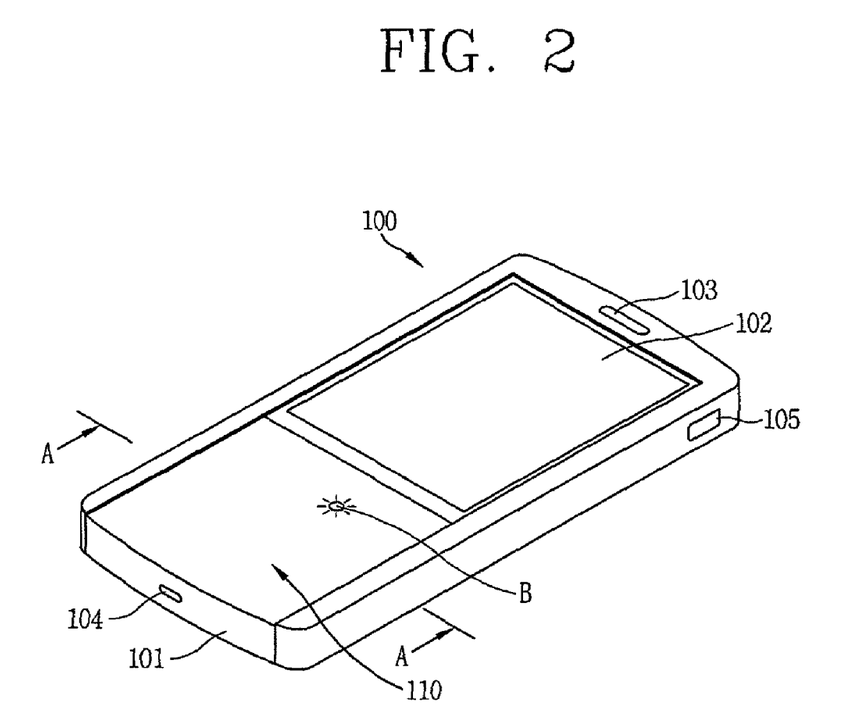
FIG. 2 is a perspective view of a mobile terminal according to a first exemplary embodiment of the present invention.

A mobile terminal 100 according to a first exemplary embodiment, as seen in FIG. 2, includes a terminal body 101 and an input device 110 disposed at a front side of a lower portion of the terminal body 101. A display unit 102 for displaying visual information is located at an upper side of the input device 110. The display 102 is configured to display numbers, characters, or other symbols inputted through the input device 110 or the shifting of a cursor or pointer. The input device 110 and the display unit 102 may not be necessarily disposed to be close and can be disposed on mutually different surfaces depending on configuration and structure of the mobile terminal.

The input device 110 may have a lighting (illumination) effect or pattern that can be recognized by a user by lighting a changeable position or region. For example, as seen in FIG. 2, a key illumination (B) in the form of a flashing or blinking light may be implemented at a particular position of the input device 110. Other variations of illumination patterns and configuration of the input device 110 will be described in detail below.

A speaker 103 and a microphone 104 can be located at upper and lower end portions of the mobile terminal 100, respectively, and are connected with an internal wireless communication module to allow the user to perform call communication while on the move. An optical sensor 105 that can detect light from the exterior of the mobile terminal 100 can be provided at one side of the terminal body 101. The microphone 104 or the optical sensor 105 may provide an illumination effect to the user through the input device 110 in response to an external voice signal or an optical signal. Similarly, the internal wireless communication module may provide an illumination effect as well.

Figure 3:
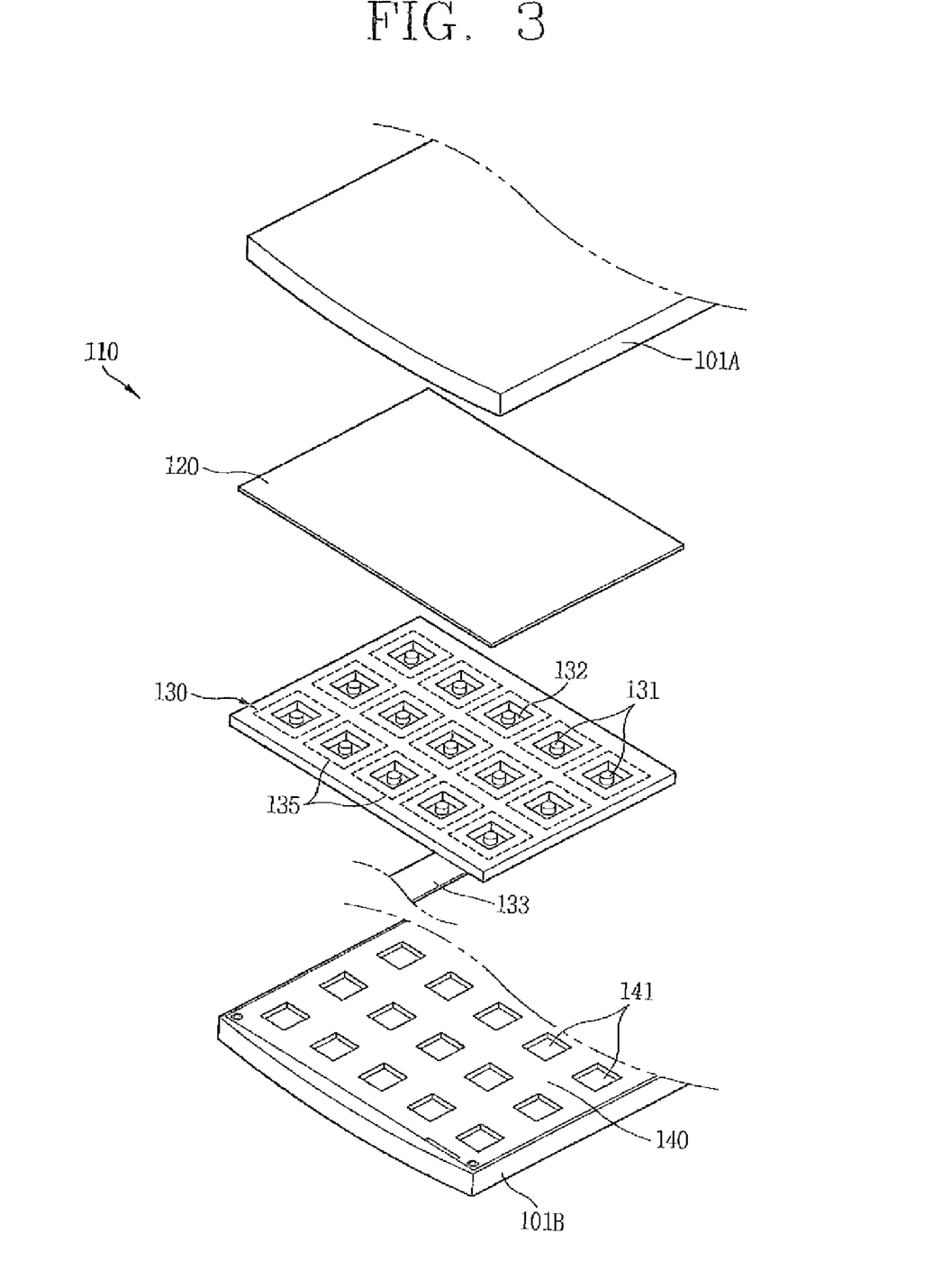
FIG. 3 is an exploded perspective view of an input device of the mobile terminal of FIG. 2.
Figure 4:
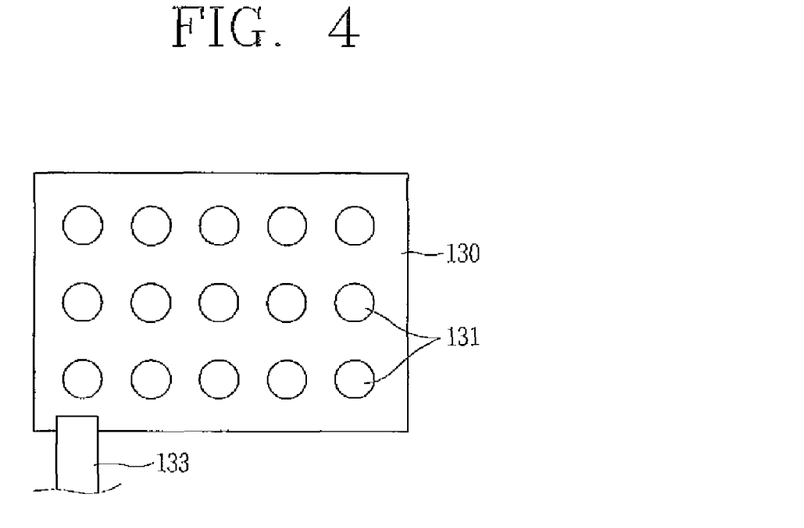
FIG. 4 is a rear view of a touch board of FIG. 3.
Figure 5:
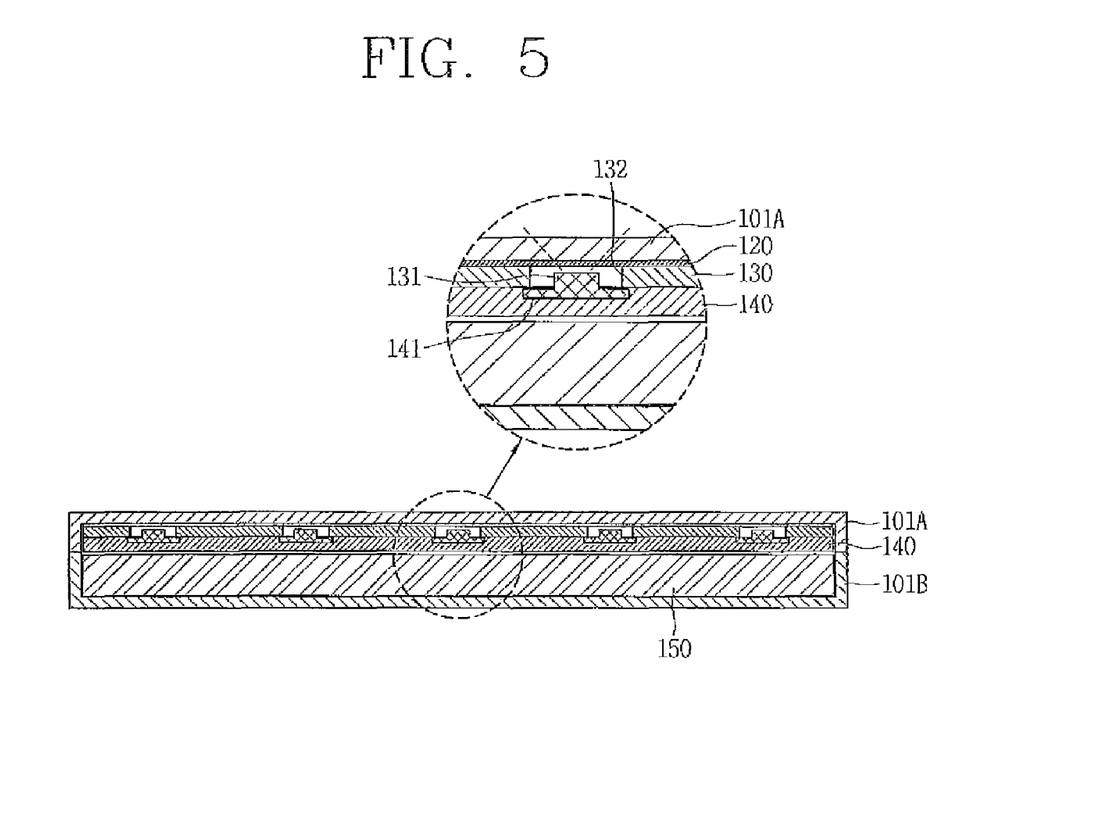
FIG. 5 is a sectional view taken along line A-A of the mobile terminal of FIG. 2.

As seen in FIGS. 3-5, the input device 110 includes a cover or housing 101A having at least one transmissive region, a touch board 130 located substantially adjacent a lower side of the cover 101A and configured to sense a touch applied to the cover 101A, and a plurality of light emitting units 131 positioned at a lower surface of the touch board 130 and at least partially located in the touch board 130.

The cover 101A, together with a lower cover 101B, may form the external appearance of the mobile terminal 100, and the transmissive region allows light generated from the lower light emitting units 131 to pass therethrough so as to be recognized by the user. The cover 101A can be made of a transparent or opaque resin material that can maintain durability over repetitive touches or a glass or ceramic material. In addition, the cover 101A may be integrally formed with a window that provides the external appearance of the display unit 102.

As noted above, the touch board 130 performs an input operation by sensing a touch applied to the cover 101A. The touch board 130 can be constructed in such a form suitable for sensing a change in capacitance of a touched portion of the cover 101A and operate accordingly. Also, the touch board 130 can be implemented to sense pressure of a finger of the user applied to the cover 101A and operate accordingly. In particular, as seen in FIG. 3, the touch board 130 includes a plurality of touch regions 135 arranged geometrically. Namely, a touch signal sensed within a single touch region 135 can be recognized as the same signal. The gaps between touch regions 135 can be controlled to provide larger or smaller touch regions 135.

The light emitting units 131 can be mounted on the lower surface of the touch board 130, whereby the touch board 130 can be modularized with the light emitting units 131. The touch board 130 and light emitting units may be controlled through a single connection unit 133, and thus, the components can be reduced and the overall volume can be also reduced. The connection unit 133 can be a FPCB (Flexible Printed Circuit Board).

The light emitting units 131 may be provided in various arrangements, for example, as seen in FIG. 3, the light emitting units are arranged in a 3×5 matrix form. In addition, the light emitting units 131 can be arranged in any desirable matrix form of M×N (M and N are integers greater than one). The number and disposition of the light emitting units 131 can be controlled to have a geometrical shape such as, for example, a triangular shape, a circular shape, a cross shape, a rectangular shape, or a ring shape.

A light guide 132 corresponding to cacti light emitting unit 131 may be provided in the touch board 130. As seen in FIG. 5, the light guide 132 may be provided in the form of a through hole for each light emitting unit 131, and the light emitting unit 131 can be at least partially received in each through hole. The light guide 132 can be also provided in such a form that the through holes can be filled with a filler made of a transmissive material. The light emitting units 131 can be mounted such that they are positioned at a lower side of the touch board 130 and partially received in the light guide 132.

As seen in FIGS. 3 and 5, the touch board 130 may be supported by a support plate 140 positioned at the lower side of the touch board. A receiving hole 141 for partially receiving each light emitting unit 131 located at the lower side of the touch board 130 can be formed on an upper surface of the support plate 140.

A diffusion member 120 may be provided between the cover 101A and the touch board 130 in order to allow light which has passed through the light guide 132 to be diffused therethrough to be visible through the cover 101A. The diffusion member 120 can be formed such that particles or patterns that serve to cause light diffusion operation are added to a base material of a sheet type. Preferably, the diffusion member 120 can be formed as a double-sided tape for attaching the cover 101A and the touch board 130 to each other. Because the light emitting units 131 are located close to the cover 101A, the diffusion member 120 may improve on the phenomenon where particular portions of the cover 101A are excessively illuminated while other portions remain relatively dark. Rather than generating bright spots, the diffusion member assists in uniformly distributing light to implement an overall smooth illumination effect for the region. The diffusion member 120 may be formed to cover at least the touch board 130, and in this exemplary embodiment, the touch board 130 and/or the light emitting units 131 may not be seen when the light emitting units are not illuminated. In other words, the diffusion member 120 prevents a used from detecting outlines of individual light emitting units or the touch board 130.

A print layer having characters, numbers, or symbols can be formed between the cover 101A and the diffusion member 120 to allow the user to discern an input key through the cover 101A. In order to provide a character, a number, or a symbol, a transmissive resin sheet (not shown) may be disposed between the cover 101A and the diffusion member 120 and the character, the number, or the symbol may be printed on the transmissive resin sheet. Alternatively, the character, the number, or the symbol may be etched, engraved, or embossed on lower or upper surfaces of the cover 101A. In addition, the diffusion member 120 itself can be formed with characters, numbers, or symbols, so as to be discernible by the user.

Figure 6:
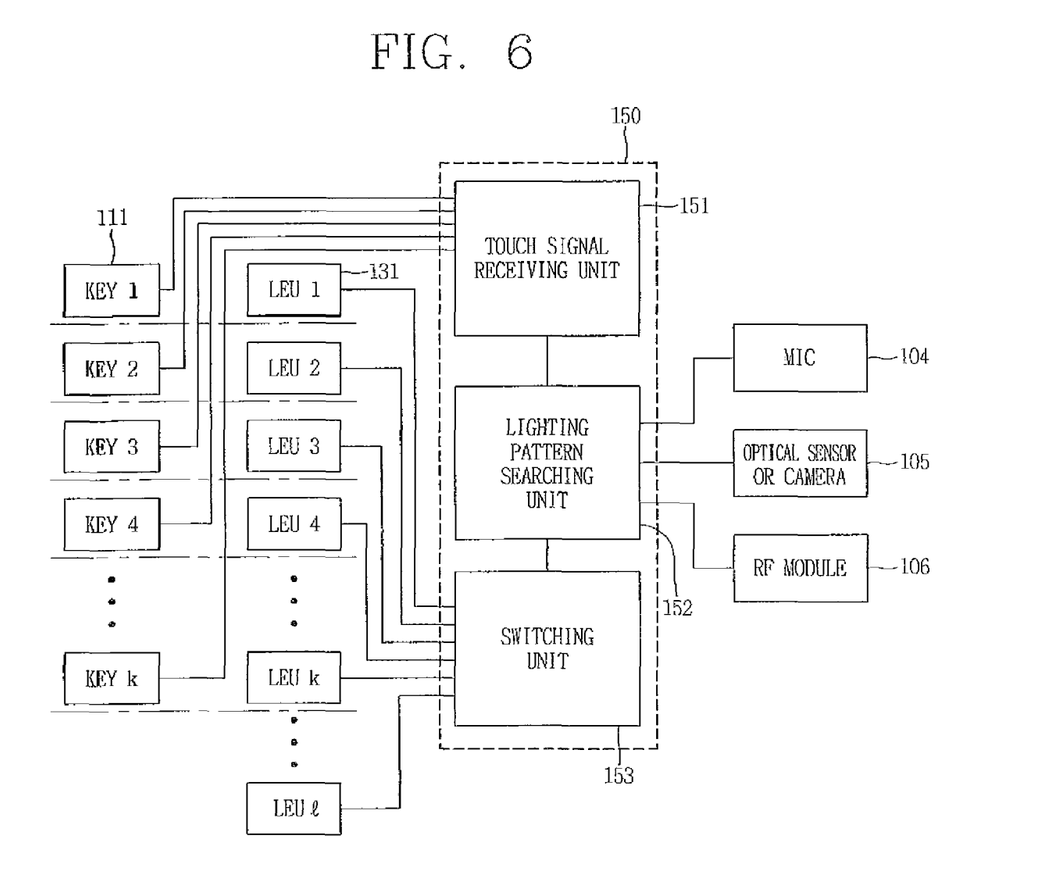
FIG. 6 is a control block diagram of the input device according to the first exemplary embodiment of the present invention.

The input device 110 also includes a controller 150, as seen in FIGS. 5 and 6, which is provided to selectively turn on at least one of the light emitting units 131 to be visible through the at least one transmissive region when the touch board 140 senses a touch applied to the cover 101A.

A certain number of light emitting units 131 (light emitting unit 1 to light emitting unit k) can be adjacent to keys 111 (key 1 to key k). Additional light emitting units 131 (such as light emitting unit 1) can be provided in which light emitting unit 1 to light emitting unit k may correspond to key 1 to key K, and the remaining light emitting units are distributed in the mobile terminal 100.

The controller 150 includes a touch signal receiving part 151 that receives a signal from the touch board 130 and retrieves a corresponding position and a discernment or recognition value, an illumination or lighting pattern searching part 152 that retrieves an illumination pattern for a light emitting unit 131 corresponding to the signal retrieved by the touch signal receiving part 151, and an ON/OFF signal applying part or switching unit 153 that applies an ON/OFF signal to the light emitting units 131 corresponding to the illumination pattern among the light emitting units 131. The illumination patter can control one or more light emitting units and provide various effects that will be described in detail below.

The touch signal receiving part 151 is connected with each key 111, and when any key 111 is touched, the touch signal receiving part 151 applies a corresponding signal to the illumination pattern searching part 152.

The illumination pattern retrieved by the illumination pattern searching part 152 can be previously set or can be generated or changed by the user. The illumination pattern can be generated to control one of a position, an ON/OFF time, brightness, or any combination thereof. Namely, which light emitting unit is to be turned on, with which brightness level, and how long a light emitting unit is to be operated (in this case, an illumination effect of turning off or on or gradually brightening or darkening can be controlled) can be set according to a particular concept or design.

Each light emitting unit 131 can be formed to implement multiple colors, and in this case, the discernment signal provided to the user can be generated to control one of color, position, an ON/OFF time, brightness, or any combination thereof.

The illumination pattern can be set to be changed according to various usage modes such as when the mobile terminal 100 performs call communication, inputs a character or a number, plays music when the mobile terminal is provided with a music play function, takes photographs when the mobile terminal is provided with a camera, reproduces video, and when the user watches a broadcast when the mobile terminal has a broadcast reception function. In this case, the illumination pattern can be set to illuminate keys used for the corresponding mode to offer guidance. Namely, the operable keys are discerned by light.

In the exemplary embodiment of the present invention, the illumination pattern searching part 152 may control the light emitting units selected by the illumination pattern previously set or set later according to a voice signal inputted to the microphone 104, a light signal inputted to the optical sensor or the camera 105, or a radio wave signal received by a wireless communication module 106 that handles receiving of a call or a message.

Figure 7A:
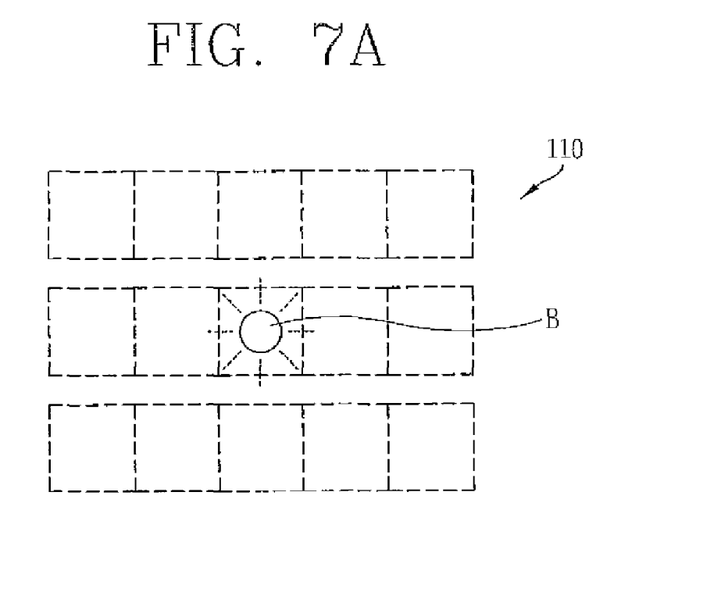
FIGS. 7A to 7D are representative operation views providing a discernment signal to a user by key illumination according to the first exemplary embodiment of the present invention.

With reference to FIG. 7A, the input device 110 can be set to show a state of the mobile terminal to the user by illuminating a particular portion of the input device 110. For example, when the mobile terminal is in an ON state while the display 102 is ill an OFF state, light (B) of a particular position indicates a standby state. In this case, the light (B) can have an effect of being periodically brightened or darkened. In addition, the light (B) indicating the standby state can reduce a driving time of the display unlit 102, to thus reduce power consumption.

Figure 7B:
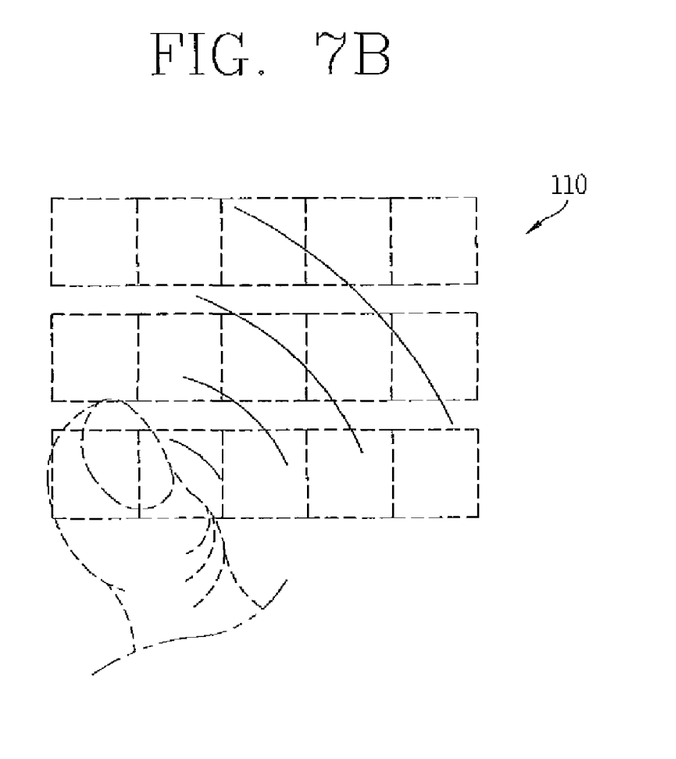

FIG. 7B shows visual implementation of waves of light such that when the user touches a particular position of the input device 110, light emitting units starting from those positioned at the particular position to those positioned away therefrom are sequentially turned on and off to generate a wave effect.

Figure 7C:
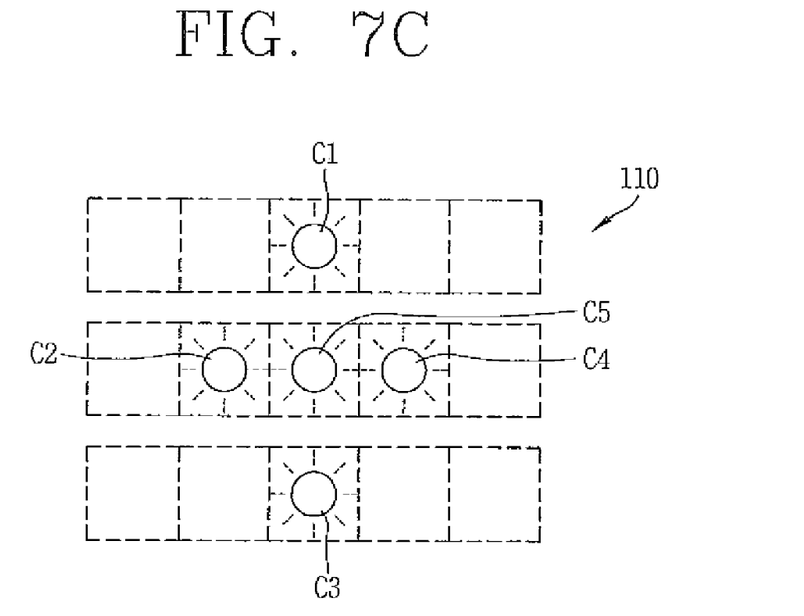

FIG. 7C shows a case where only keys available in a particular mode are illuminated. For example, the illuminated keys C1 to C4 are assigned as keys (direction control keys) for shifting a pointer up, down, left and right, and a key Cs is assigned as an 'OK' key or enter key. The overall positions and gaps of the keys C1 to C5 can be varied. The effects of touching the keys C1 to C5 can be implemented in various forms. For example, when one of the keys C1 to C5 is touched, the key can be recognized by the user in a different form (a change in color, blinking or being brighter) from other keys.

Figure 7D:
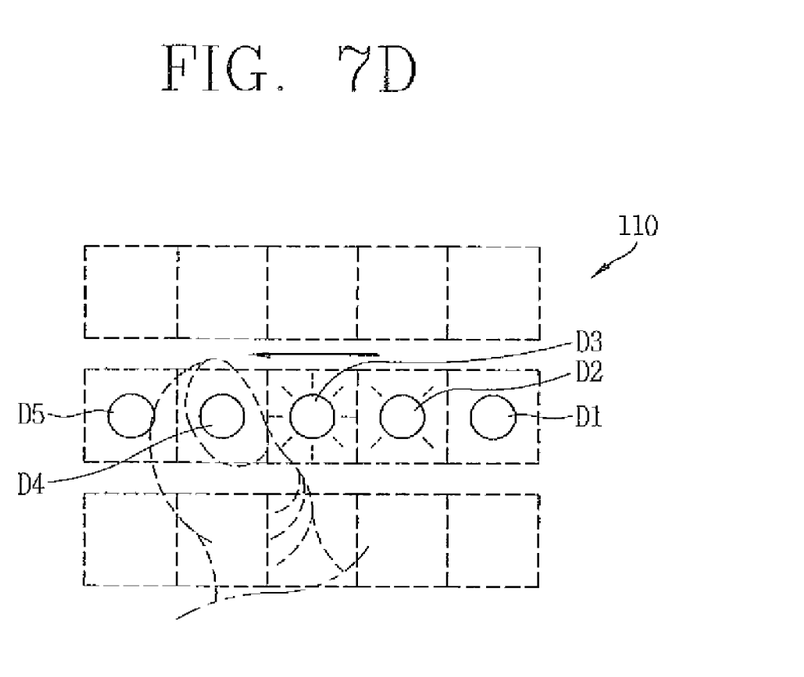

FIG. 7D shows a case that as touches by the user move in a particular direction, the light emitting units at the contacted positions are turned on and then gradually turned off providing a trail effect. In particular, the directional movement of the touches can be combined with a scroll function allowing the cursor or the pointer to be shifted quickly to thus maximize the lighting effect.

Figure 8:
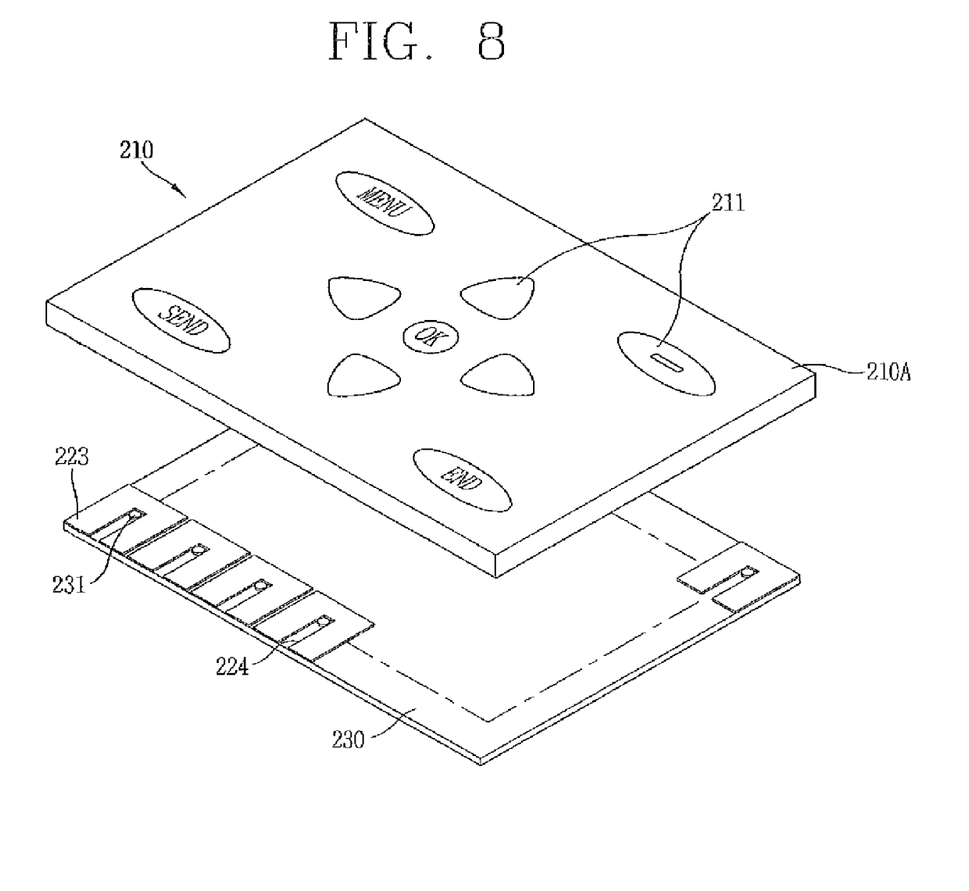
FIG. 8 is an exploded perspective view of an input device according to a second exemplary embodiment of the present invention.
Figure 9:
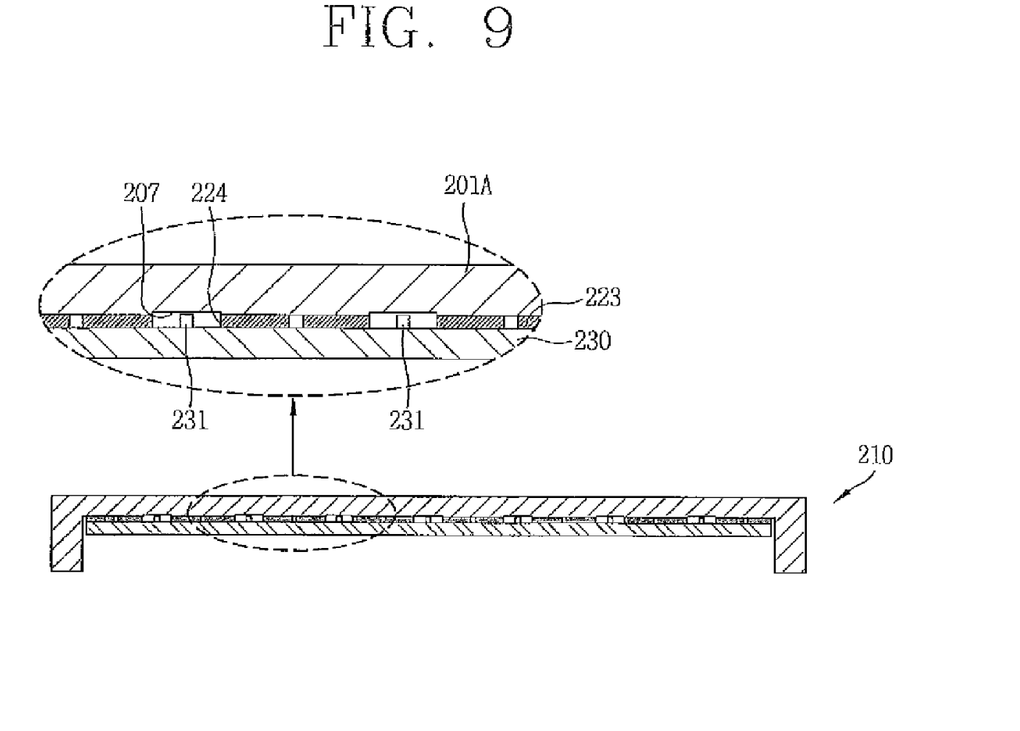
FIG. 9 is a sectional view of the input device in FIG. 8.

A second exemplary embodiment of an input device 210, as seen in FIGS. 8 and 9, includes a touch board 230 with light emitting units 231 mounted on the upper surface thereof, and a plurality of intermediate members 223 are provided to at least partially surround the light emitting units 231 on the touch board.

A cover 201A is located at an upper side of the intermediate members 223, and when any key 211 is touched, a corresponding signal can be recognized by the touch board 230 and a corresponding input can be made. In this configuration, the light emitting units 231 may be disposed to be more densely distributed that that of the first exemplary embodiment of the present invention, and light can be irradiated to a partial region of the cover 201A by the intermediate members 223 surrounding the light emitting units 231.

With reference to FIG. 9, receiving recesses 207 for receiving the light emitting units 231 are formed with a certain depth on the lower surface of the cover 201A. Accordingly, a certain distance can be maintained between the light emitting units 231 and the cover 201A even if the light emitting units 231 protrude beyond the upper surface of the corresponding intermediate members 223. As such, the intermediate member 223 includes through holes 224 for providing a space in which the light emitting units 231 can be received. The through holes 224 allows light emitted from the light emitting units 231 to be irradiated only to a certain region of the cover 201A. For example, when light is to be irradiated only to a region where a mark 'MENU' is positioned, only the light emitting unit 231 positioned at a lower portion of the region emits light, and when light is to be irradiated only to a region where a mark 'SEND' is positioned, only the light emitting unit 231 positioned at a lower portion of the region emits light. The same goes for a region where a directional mark which indicates cursor movement or shifting is positioned and for a region where a mark 'OK' which means confirmation is positioned.

The intermediate member 223 is not limited to a particular shape. For example, it can be formed as a thin sheet and have an arbitrary shape such as a circular shape or a polygonal shape. The intermediate member 223 can be formed to be thinner than the height of the light emitting unit 231, and in this case, the overall thickness of the input device 210 can be reduced.

Figure 10:
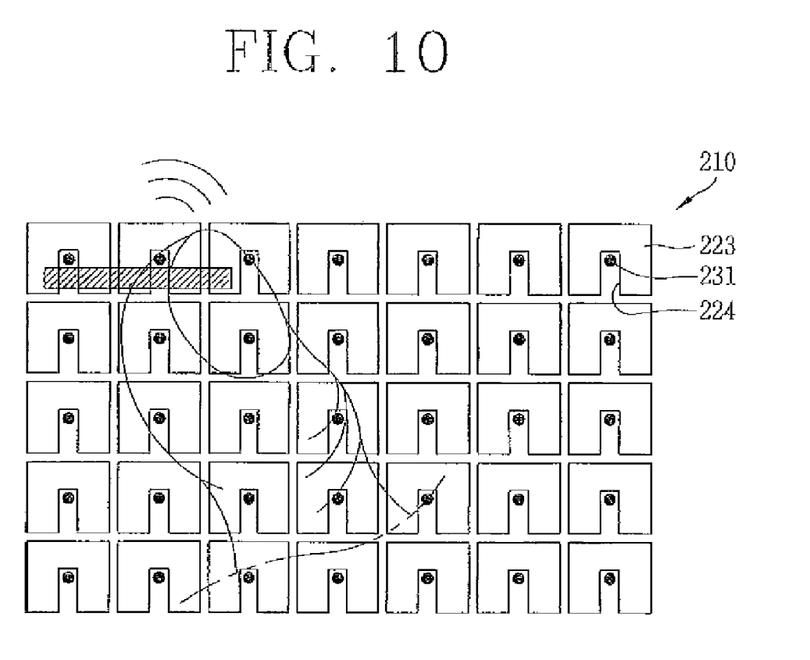
FIG. 10 shows an operational state of the input device in FIG. 8.

With such a construction, as shown in FIG. 10, an input device 210 having light emitting units 231 in a 5×7 matrix may be provided. It is understood that other matrix configurations may be provided. When a user's finger contacts on or moves to a particular position over the light emitting units 231, the corresponding light emitting unit, or other light emitting units at other positions designated by the illumination pattern, emit light, thereby obtaining an illumination effect.

Figure 11:
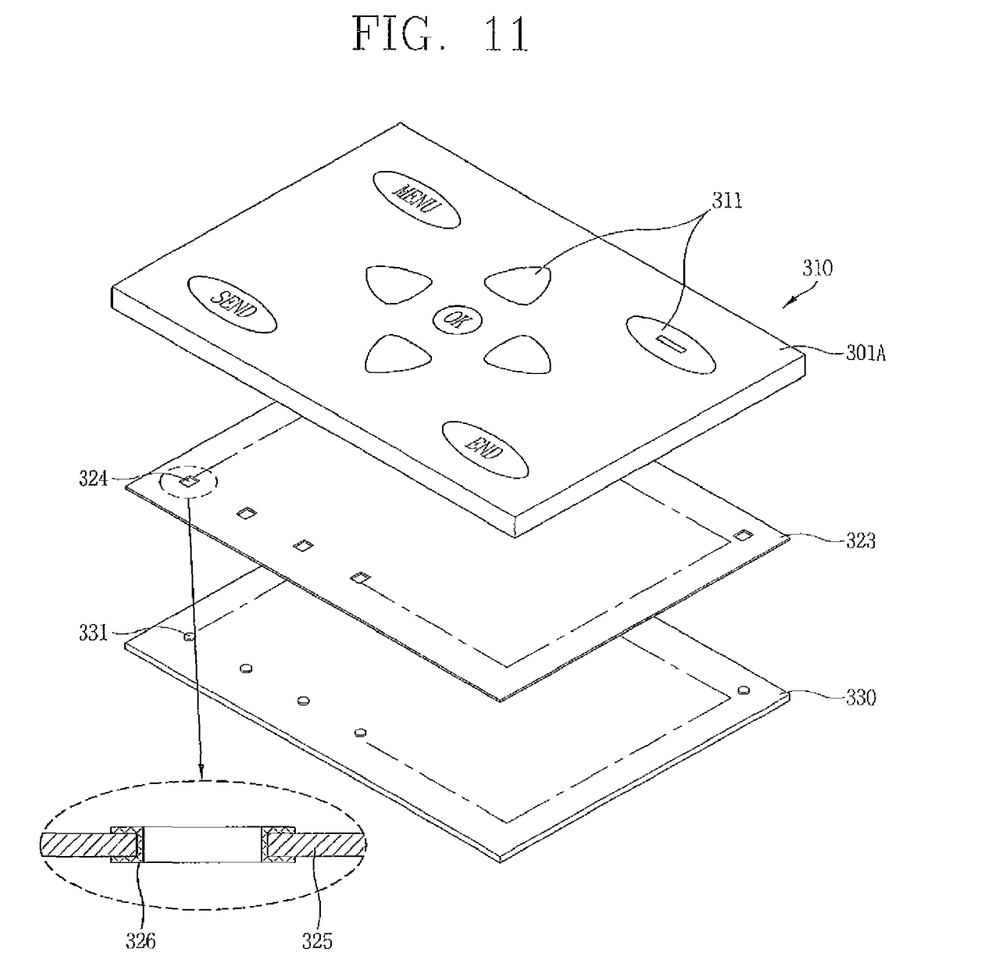
FIG. 11 is an exploded perspective view of the input device according to a third exemplary embodiment of the present invention.

An input device 310 according to third exemplary embodiment, as seen in FIG. 11, is similar to those in the former exemplary embodiments, in that the input device 310 includes a touch board 330, an intermediate member 323, light emitting units 331, and a cover 301A. Herein, the intermediate member 323 includes a plate 325 having through holes 324 providing a space in which the light emitting units 331 are received, and a signal transmission members 326 formed on an inner wall of the through holes 324 and transferring an electrical signal generated by a touch applied to the cover 301A to the touch board 330.

The plate 325 can be made of a material that cannot electrically transfer a signal, while the signal transmission members 326 are made of a material that can electrically transfer a signal. Accordingly, the plate 325 call guide light generated from the light emitting units 331 to a partial region of the cover, and the signal transmission member 326 transfers an electrical signal such as static electricity generated by a display window and a user contact to the touch board 330.

If the cover 301A is made of a non-conductive material, the intermediate member 323 may be a displaceable conductive member and may be spaced from the touch board such that pressing the cover 301A causes the intermediate member 323 to be displaced and brought into contact with the touch board 330. Once the signal transmission member 326 contacts the touch board 330, a corresponding signal is generated by the touch board 330.

Figure 12:
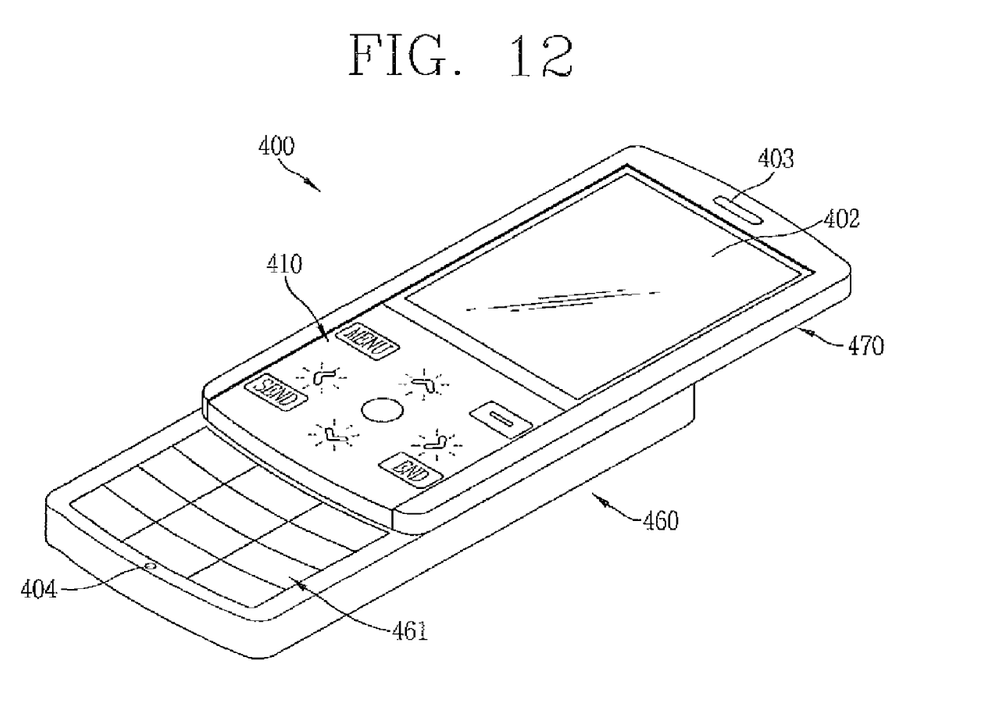
FIG. 12 is a perspective view of a slide type mobile terminal with an input device according to a fourth exemplary embodiment of the present invention.
Figure 13A:
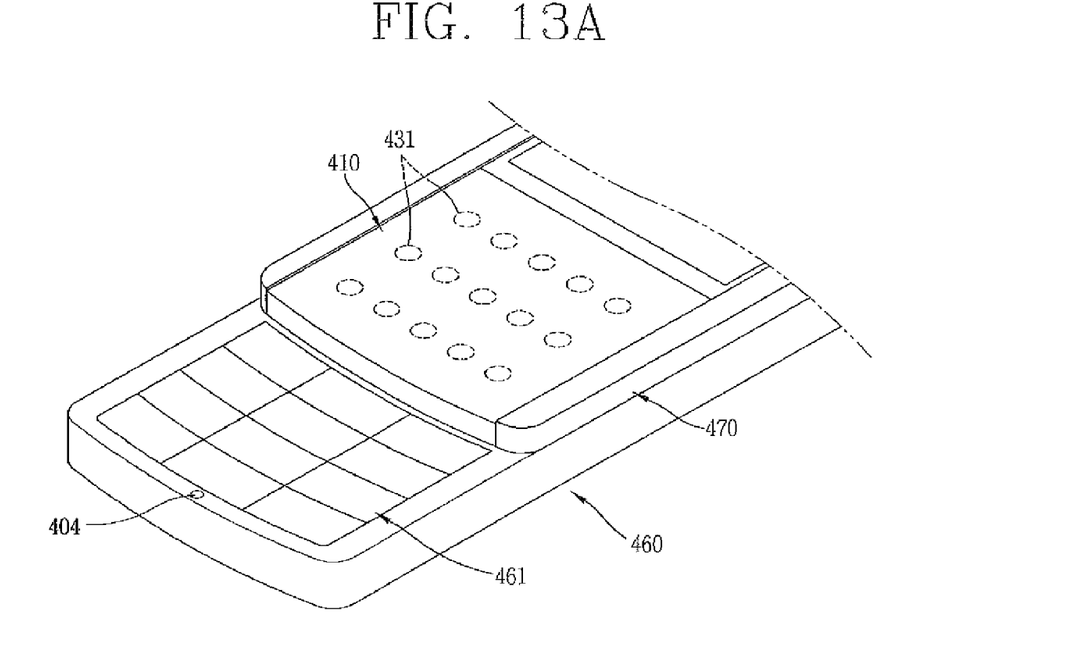
FIGS. 13A and 13B show operational states of a keypad in FIG. 12.
Figure 13B:
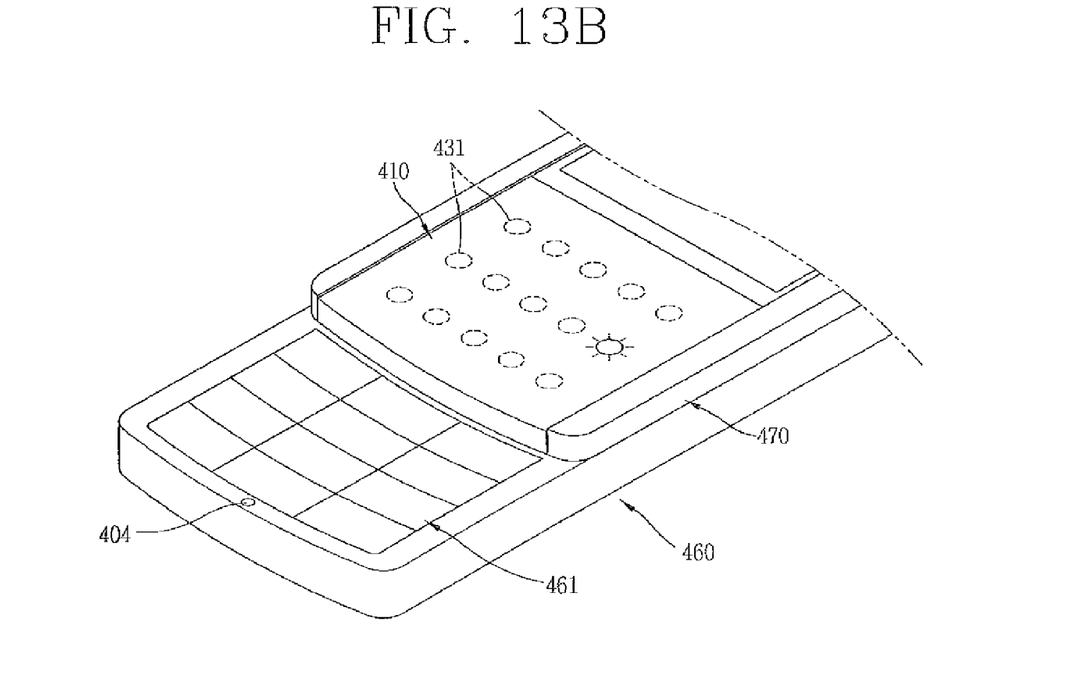

A mobile terminal 400 according to a fourth exemplary embodiment of the present invention, as shown in FIGS. 12, 13A, and 13B, includes a first body 460 having a keypad 461 and a second body 470 slidably connected to the first body 460. The mobile terminal includes an input device 410 located in the second body 470.

The input device 410 includes keys 411 with particular marks provided thereon. Each key 411 can be formed by a printing method, an engraving method, or an embossing method as described above. Each key 411 includes a corresponding light emitting unit (not shown). The disposition and operation of the light emitting units are similar to those in the former exemplary embodiments of the present invention, so its detailed description will be omitted. As such, the keypad 410 can be set to at least partially implement the previously described embodiments.

As shown in FIG. 13A, all the keys may be set to be in an ON state in a standby mode, and comparatively, as shown in FIG. 13B, the keys may be set such that when a particular key is touched, only the corresponding key is illuminated. Although a particular key is shown as illuminated, it is understood that the light emitting unit can be placed at a different location and still illuminate one or more keys. In addition, the light emitting unlit can be disposed within a portion with no key. In this case, it can server to perform a different function such as general illumination or decorative display.

Figure 14:
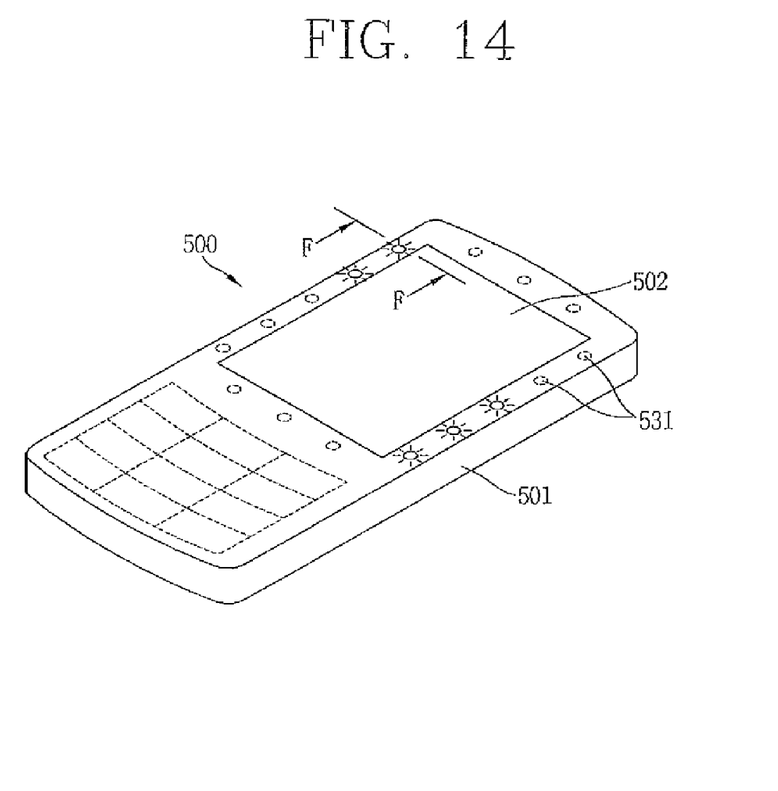
FIG. 14 is a perspective view of the mobile terminal with light emitting units disposed around its display unit according to the exemplary embodiment of the present invention.
Figure 15:
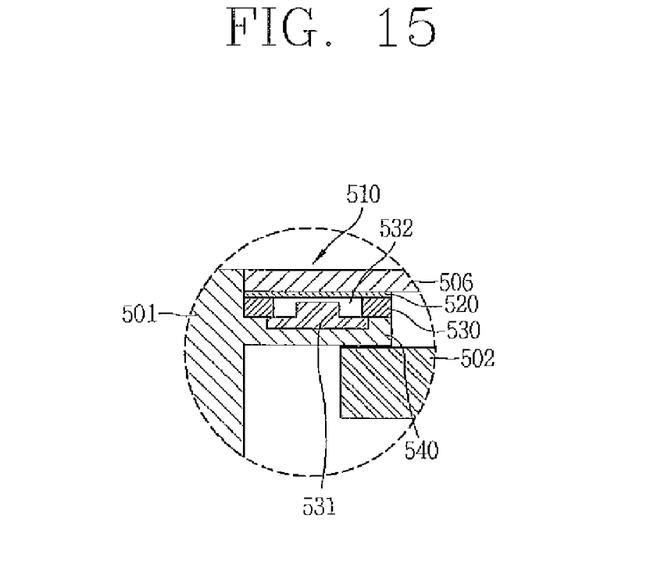
FIG. 15 is a partial sectional view taken along line F-F of the mobile terminal of FIG. 14.

A mobile terminal according to a fifth exemplary embodiment, as seen in FIGS. 14 and 15, includes a terminal body 501 on which a display unit 502 is provided on its front surface, and an input device 510 having an individual illumination function is located around the display unit 502. The light emitting units 531 may be disposed in the form of a single line or multiple lines along the edges of the display unit 502.

As seen in FIG. 15, the input device 510 includes a transmissive cover 506 that protects the display unit 502 and is positioned at an outer edge of the display unit 502. The cover 506 is held by the terminal body 501 and a support 540.

A diffusion member 520 and a touch board 530 can be sequentially positioned at a lower side of the cover 506, and a plurality of light emitting units 531 call be mounted below the touch board 530.

Each light emitting unit 531 is disposed to be at least partially received in a light guide 532 formed at the touch board 530.

With such a configuration, the light emitting unit 531 can provide a signal such as an illumination position, color, time (blinking), etc., to the user in response to a touch or a different input signal, creating a more active environment.

As so far described, the input device and the mobile terminal having the same according to the present invention have such an advantage that because the plurality of light emitting units and the controller for controlling the light emitting units provide various discernible information to users, thereby improving user convenience.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined ill the appended claims, and therefore all changes and modifications that fall within the metes and bounds of the claims, or equivalents of such metes and bounds are therefore intended to be embraced by the appended claims.

What is claimed is:

1. An input device comprising:
   a housing formed of a non-conductive material and having at least one transmissive region;
   a touch board spaced from the housing;
   a displaceable conductive member located between the housing and the touch board; and
   a plurality of light emitting units, each light emitting unit being located on the touch board, wherein the displaceable conductive member includes:
      a plate having a plurality of through holes, each through hole defining a space in which one of the plurality of through holes is received; and
      a signal transmissive member formed at the periphery of each through hole, each signal transmissive member being configured to transfer an electrical signal generated by a touch applied to the housing to the touch board.

2. The input device of claim 1, wherein the housing includes an input key to input information.

3. The input device of claim 2, further comprising a print layer located on a lower surface of the housing, the print layer including at least one of a character, a number, or a symbol is provided on the print layer and is visible through the input key.

4. The input device of claim 2, wherein at least one of a character, a number, or a symbol is engraved or embossed at one of an upper and lower surface of the housing to indicate the input key.

5. The input device of claim 1, wherein the plurality of light emitting units are light emitting diodes (LEDs).

6. The input device of claim 1, wherein the plurality of light emitting units are arranged in an M by N matrix form, where M and N are integers greater than one.

7. The input device of claim 1, further comprising a controller configured to selectively turn on at least one of the light emitting units to be visible through the at least one transmissive region when the touch board senses a touch applied to the housing.

8. The input device of claim 7, wherein the controller includes:
   a touch signal receiving unit configured to receive a signal from the touch board and retrieve a corresponding position and recognition value;
   an illumination pattern searching unit configured to retrieve an illumination pattern of a light emitting unit corresponding to the signal retrieved by the touch signal receiving unit; and
   an on/off signal applying unit that applies an on/off signal of light emissions corresponding to the illumination pattern.

9. The input device of claim 8, wherein the light illumination pattern is generated by one of position, on/off time, brightness of the light emitting units, and any combination thereof.

10. The input device of claim 8, wherein the light emitting units are configured to implement at least two colors, and the illumination pattern is generated by a combination of color, position, on/off time, and brightness of the light emitting units.

11. A mobile terminal comprising:
    a cover formed of a non-conductive material and having at least one transmissive region;
    a touch board spaced from the cover;
    a displaceable conductive member located between the cover and the touch board; and
    a plurality of light emitting units, each light emitting unit being located on the touch board, wherein the displaceable conductive member includes:
       a plate having a plurality of through holes, each through hole defining a space in which one of the plurality of through holes is received; and
       a signal transmissive member formed at the periphery of each through hole, each signal transmissive member being configured to transfer an electrical signal generated by a touch applied to the housing to the touch board.

12. The mobile terminal of claim 11, wherein the plurality of light emitting units are light emitting diodes (LEDs).

13. The mobile terminal of claim 11, wherein the plurality of light emitting units are arranged in an M by N matrix form, where M and N are integers greater than one.

14. The mobile terminal of claim 11, further comprising a controller configured to selectively turn on at least one of the light emitting units to be visible through the at least one transmissive region when the touch board senses a touch applied to the cover.

15. The mobile terminal of claim 14, wherein the controller includes:
    a touch signal receiving unit configured to receive a signal from the touch board and retrieves a corresponding position and recognition value;
    an illumination pattern searching unit configured to retrieve an illumination pattern of a light emitting unit corresponding to the signal retrieved by the touch signal receiving unit; and
    an on/off signal applying unit that applies an on/off signal of light emissions corresponding to the illumination pattern.

16. The mobile terminal of claim 15, wherein the controller changes an illumination pattern of the plurality of light emitting units according to a usage mode of the mobile terminal.

* * * * *